(12) United States Patent
Muvavarirwa et al.

(10) Patent No.: US 9,743,132 B2
(45) Date of Patent: *Aug. 22, 2017

(54) REMOTE MEDIA STREAMING

(71) Applicant: Time Warner Cable Enterprises LLC, New York, NY (US)

(72) Inventors: Ranga Muvavarirwa, Denver, CO (US); Noah Paci, Broomfield, CO (US); John H. Ipson, IV, Denver, CO (US); Ethan Lawrence Wolf, Aurora, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,348

(22) Filed: Jan. 12, 2015

(65) Prior Publication Data

US 2015/0128196 A1 May 7, 2015

Related U.S. Application Data

(63) Continuation of application No. 13/551,186, filed on Jul. 17, 2012, now Pat. No. 8,949,923.

(Continued)

(51) Int. Cl.
*H04N 7/173* (2011.01)
*H04N 21/436* (2011.01)
(Continued)

(52) U.S. Cl.
CPC ... *H04N 21/43615* (2013.01); *H04N 7/17318* (2013.01); *H04N 21/4108* (2013.01);
(Continued)

(58) Field of Classification Search
CPC ......... H04N 21/43615; H04N 21/6156; H04N 21/4108
(Continued)

(56) References Cited

U.S. PATENT DOCUMENTS

| 8,949,923 | B2* | 2/2015 | Muvavarirwa | .. H04N 21/43615 |
| | | | | 370/332 |
| 2008/0235733 | A1* | 9/2008 | Heie | ...................... H04N 7/163 |
| | | | | 725/46 |

(Continued)

*Primary Examiner* — Michael B Pierorazio
(74) *Attorney, Agent, or Firm* — Chapin IP Law, LLC

(57) ABSTRACT

A redirection device for remote streaming media reroutes media content sent to the receiving device, typically located in the home of the subscriber, to the subscriber's mobile device such as a laptop or smartphone. Remote media streaming provides media recipients with capabilities for out-of-home (OOH) viewing for remotely rendering media content from a subscriber based receiving device to a personal electronic device. The remote streaming redirects media that has already been received by the subscription based receiving device, such that the redirection device forwards a rendering signal including the requested content to the rendering device based on the reported location. The redirected media stream therefore emanates from the redirection device as an independent transmission of content already received by the receiving device, and not as a separate transmission of media content from the content provider.

20 Claims, 7 Drawing Sheets

Related U.S. Application Data

(60) Provisional application No. 61/601,249, filed on Feb. 21, 2012.

(51) Int. Cl.
*H04N 21/472* (2011.01)
*H04N 21/41* (2011.01)
*H04N 21/61* (2011.01)

(52) U.S. Cl.
CPC ....... *H04N 21/4126* (2013.01); *H04N 21/472* (2013.01); *H04N 21/47214* (2013.01); *H04N 21/6106* (2013.01); *H04N 21/6156* (2013.01); *H04N 21/6181* (2013.01)

(58) Field of Classification Search
USPC ......................................................... 725/139
See application file for complete search history.

(56) References Cited

U.S. PATENT DOCUMENTS

2010/0107186 A1* 4/2010 Varriale ................. H04H 60/23
 725/31
2013/0198787 A1* 8/2013 Perry, II ........... H04N 21/25816
 725/86

* cited by examiner

REMOTE MEDIA STREAMING

RELATED APPLICATIONS

This application is a continuation of earlier filed U.S. patent application Ser. No. 13/551,186 entitled "REMOTE MEDIA STREAMING", filed on Jul. 17, 2012 and claims priority to U.S. Provisional Patent Application No. 61/601,249 filed on Feb. 21, 2012 entitled, "REMOTE MEDIA STREAMING", the contents and teachings of which are hereby incorporated by reference.

BACKGROUND

Evolution of personal electronic devices has resulted in a wide variety of media content availability for mobile devices. Transport technologies such as 3G, WiFi and 4G allow streaming media transport to devices located within range of a mobility cell or WiFi hotspot. Concurrently, digital formats of media options such as audio and video are allowing content providers, such as cable TV and Internet-based services, to offer an increasing array of content delivery, typically over hybrid fiber-coax (HFC) networks traditionally developed for providing cable (wired) television. These distinctions have become blurred in recent times as Internet providers and cable TV providers are typically the same entity providing both services to a residence under a subscriber agreement. A typical user, therefore, has available a plethora of content receiving capability from one of several content providers, depending on the device and location of the user.

SUMMARY

Remote media streaming provides media recipients with capabilities for out-of-home (OOH) viewing for remotely rendering media content from a subscriber based receiving device such as a settop box or similar rendering interface to a personal electronic device. A redirection device reroutes media content sent to the receiving device, typically located in the home of the subscriber, to the subscriber's mobile device such as a laptop or smartphone. While conventional 3G, 4G and web based streaming techniques transmit media content directly to the recipient mobile device, remote streaming redirects media that has already been received by the subscription based receiving device, such that the redirection device forwards a rendering signal including the requested content to the recipient mobile device or other rendering device based on the reported location of the rendering device. The redirected media stream therefore emanates from the redirection device as an independent transmission of content already received by the receiving device, and not as a separate transmission of media content from the content provider.

A content delivery network (CDN) provides multimedia services, such as video and audio, to a subscriber under a fee-for-services basis. A service provider sends services such as broadcast video and video-on-demand to a local receiving device (receiving device) at the subscriber's residence via the CDN. While traditional cable providers employed a so-called settop box, service providers, unlike cable providers, typically deliver to an IP-addressable user-agent/client. In either configuration, the receiving device resides proximate to the rendering device (TV) at the subscriber's residence. Modern cable providers employ a hybrid fiber/coax (HFC) network for transport of the media content from a headend to the individual subscribers via the local receiving device. Many subscribers also receive broadband Internet over the same HFC network. Further, many subscribers of cable/Internet also have personal electronic devices such as cellphones and smart phones relying on cell networks such as 3G and 4G under a separate subscriber agreement.

Widespread availability of 3G and 4G cellular services extends such coverage to all but the most remote residences. The result is that Internet and cable TV providers typically employ a common coaxial cable for wired media services to a subscriber, and Internet devices such as cable modems as well as settop boxes, traditionally associated with cable television, are all network devices employing the well entrenched IP address protocol. Further, wireless Internet access through 3G or 4G cellular, or WiFi access from either a home or external location (e.g. coffee shop, airport, etc.), is available through an Internet conversant device for receiving streaming media at a current subscriber location inside or outside of the home. In this manner, subscribers (users) have multiple rendering devices available, such as cellphones, smartphones, laptops, and traditional screen displays, for receiving media content.

Configurations herein are based, in part, on the observation that a subscriber typically has multiple delivery options through which to receive media content, varying by delivery medium and rendering device. As indicated above, delivery may also be constrained or regulated by different service agreements with the providers of the different mediums.

Unfortunately, conventional approaches for media content delivery suffer from the shortcoming that the subscriber may not have the most efficient or economic delivery medium available. For example, a remote user has a 4G phone on which to finish watching a feature film started the previous evening on the living room TV. While the feature film was ordered using video-on-demand (VOD) services through the local receiving device, and has several hours of viewing time remaining, the remaining feature is unavailable on the 4G phone because 4G media downloads are provided under the data plan of the cellular provider, and do not recognize the VOD service already invoked via the home local receiving device.

Accordingly, configurations herein substantially overcome the above described shortcoming of multiple service providers by providing remote media streaming that transports a rendering signal from an in-home or local rendering area to a remote rendering device by redirecting the rendering signal to a network device associated with the remote rendering device, such as a remote smartphone. The rendering device launches a rendering application for rendering the desired media content. The rendering application determines if the device is located in an out of home (OOH) viewing area, i.e. beyond the local rendering area of the subscriber, typically the room or home in which the local receiving device is located. The rendering application sends a rendering preference and identity of a remote receiving device to the local receiving device, and the local receiving device redirects the rendering signal including the desired media content to the remote receiving device for rendering on the rendering device at the user's current location. In this manner, media content delivery extends from the local receiving device, under the subscriber agreement, to the remote receiving device and rendering device via an independent connection, rather than establishing a new fee based video request directly form the rendering device.

In further detail, a network redirection device for seamlessly redirecting media content to an OOH location includes an interface to a content delivery network for receiving a rendering signal including media content for rendering on a mobile rendering device such as a smartphone or laptop. The redirection device selectively invokes one of a local output interface configured for communication with a rendering device in the local rendering area, or a placeshifted output interface configured for communication to rendering device via a remote receiving device outside the local rendering area. An interceptor is responsive to a rendering preference from the rendering device, such that the rendering preference is for directing the rendering signal to the local output interface or the placeshifted output interface based on the network identity of a requestor from which the rendering signal emanated. The redirection device and associated function need not be a standalone device, but rather may be incorporated in the local receiving device, such as for a local WiFi transmission according to IEEE 802.11, and/or redirecting the rendering signal back over the network to the rendering device.

The redirection device is operative in a media content delivery environment having subscribers coupled to a content delivery network for receiving media on a rendering device. In conjunction with the rendering device, the redirection device redirects local media content to a remote location by identifying a local receiving device responsive to a content provider for delivering media content to rendering devices in a local media network, and determining whether the rendering device is accessible via the local media network. The redirection device redirects, if the rendering device is outside the local media network, media content to a remote receiving device, by determining a network identity of a network device through which the rendering device may receive the media content, and comparing the determined network identity to a network identity of the local receiving device. The redirection device, based on a rendering preference from the rendering device, concludes that the rendering device is outside the local media network based on a difference between the determined network identity and the network identity of the local receiving device. It should be noted that the disclosed redirection of unicast streams from in-home redirection device differs from services that deliver a unicast streams from CDN to an OOH remote receiving device precipitated on a programmer-right based policy decision. The former redirects subscriber content already received by the subscriber device; the latter generates a separate transmission stream independent of a subscription for in-home usage. In contrast to so called "TV Everywhere" services, which purport to deliver a (typically fee based) dedicated stream to a requesting network entity via an IP address, redirection as disclosed herein merely redirects a subscriber oriented stream already received at the subscriber device, and forwards or retransmits, rather than regenerating, the subscriber-requested stream to an alternate rendering device.

The above scenario gives rise to a circumstance where the same content is available via the local rendering device and also via a TV Everywhere medium, creating an apparent ambiguity in which source should be sought for content. If the user has a redirection device/local receiving device in the local/home environment, it may be more cost effective to receive content at the remote rendering device from either redirection from the local rendering device or from the separate content delivery of the TV Everywhere (i.e. individual direct IP address streaming) from the service provider.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a media content delivery environment for providing media services to subscribers via a content delivery network responsive to rendering devices. In the example configuration, a media content provider delivers media services such as streaming video and audio to a subscriber via a receiving device. Modern technology has evolved personal electronic devices of decreasing size and increasing performance such that content delivery of media such as video and audio is receivable on a variety of personal electronic devices such as smartphones and laptops, in addition to the traditional household TV. The environment depicted below leverages such personal electronic devices (mobile devices) as rendering devices for receiving a rendering signal sent to the local (in home) receiving device.

Rendering devices are responsive to the local receiving device for receiving the rendering signal via a variety of mediums, including 3G, 4G, WiFi, as well as conventional wired connections (usually reserved for the stationary TV). The wireless access mediums (3G, 4G, WiFi) vary in terms of speed and connectivity range, but operate similarly as rendering devices for receiving a rendering signal. Using 4G, a subscriber (user) would expect a substantially faster connection than 3G, depending on coverage. 4G and WiFi have similar bandwidth, suitable for supporting HD video. One difference between them is in range. WiFi is targeted to cover low range networks, while 4G was designed to replace high range mobile networks. The rendering devices as described below may couple to the CDN via the receiving device using any suitable method, typically one of 3G, 4G, WiFi and wired connections, as described above.

Figure 1:
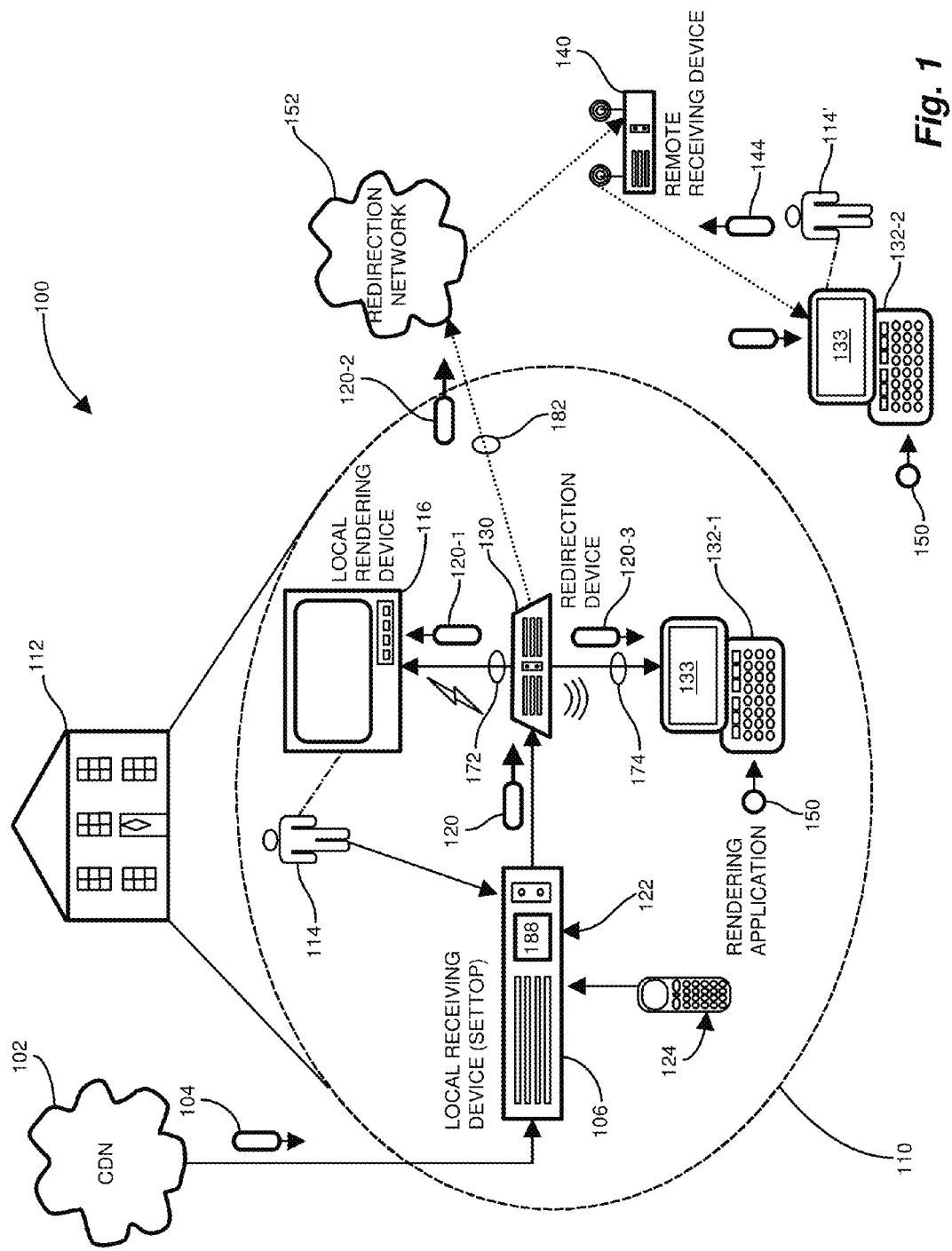
FIG. 1 is a context diagram of a media delivery environment suitable for use with configurations of the invention.

FIG. 1 is a context diagram of a media delivery environment suitable for use with configurations of the invention. Referring to FIG. 1, in a media delivery environment 100, a content delivery network 102 transmits media content 104 to a local receiving device 106, such as a local receiving device, in a local delivery environment 110. The local delivery environment is defined by the area in and around the residence 112 or dwelling of a subscriber 114. The subscriber 114 has one or more local rendering devices 116, such as a TV, connected to the local receiving device 106 (settop). The TV may connect directly, such as via HDMI or indirectly, such as via IP/DLNA to the local receiving device 106. The local receiving device 106 receives the media content 104, and extracts, decodes, or demodulates a rendering signal 120 based on a selection 122 having content for rendering on the local rendering device 116. The media content 104 includes broadcast content generally available via the CDN 102, and the user 114 selects the rendering signal 120 typically through a remote 124 for specifying a selection 122, typically a channel.

In configurations herein, a redirection device 130 is disposed between the local receiving device 106 and the local rendering device 116, and receives the rendering signal 120 including the requested content for forwarding to the local rendering device 116 or for redirection to a remote device, discussed below.

When the user is remotely located (OOH), the rendering device 132-2 is in communication with a remote receiving device 140, such as a Wi-Fi hotspot or 3G/4G cell station. The remote receiving device 140 couples back to a redirection device 130 via a redirection network 152, such as the Internet. A wrapper application 151 compares the received network identity 144 with a network identity of the local receiving device 106 (settop). If the network identity differs, and the local environment (110) includes a redirection device and the content being requested by the remote receiving device is not remote media service content for which alternate paths exist, such as general single-stream broadcast providers of VOD (video on demand) content, then redirection via the redirection device 130 commences. The rendering application 150 transmits the network identity 144 of the remote receiving device 140, with which it is connected, back to the redirection device 130, and the redirection device 130 redirects the rendering signal 120-2 to the remote rendering device 132-2 via the remote receiving device 140 indicated by the identity 144 (address).

In the case of a local, or non OOH user, the redirection device 130 compares the network identity of the local receiving device 106 and determines that the rendering signal 120-1 is to be sent to the local rendering device 116. Alternatively, in the event of a local user employing a rendering device 132-1 within the local rendering area 110, then the rendering device 132-1 receives the rendering signal 120-3, such as a WiFi signal, locally. A rendering device 132-1, disposed within the local rendering area 110, may represent a local WiFi connection within the dwelling or a hardwired TV connection.

Figure 2:
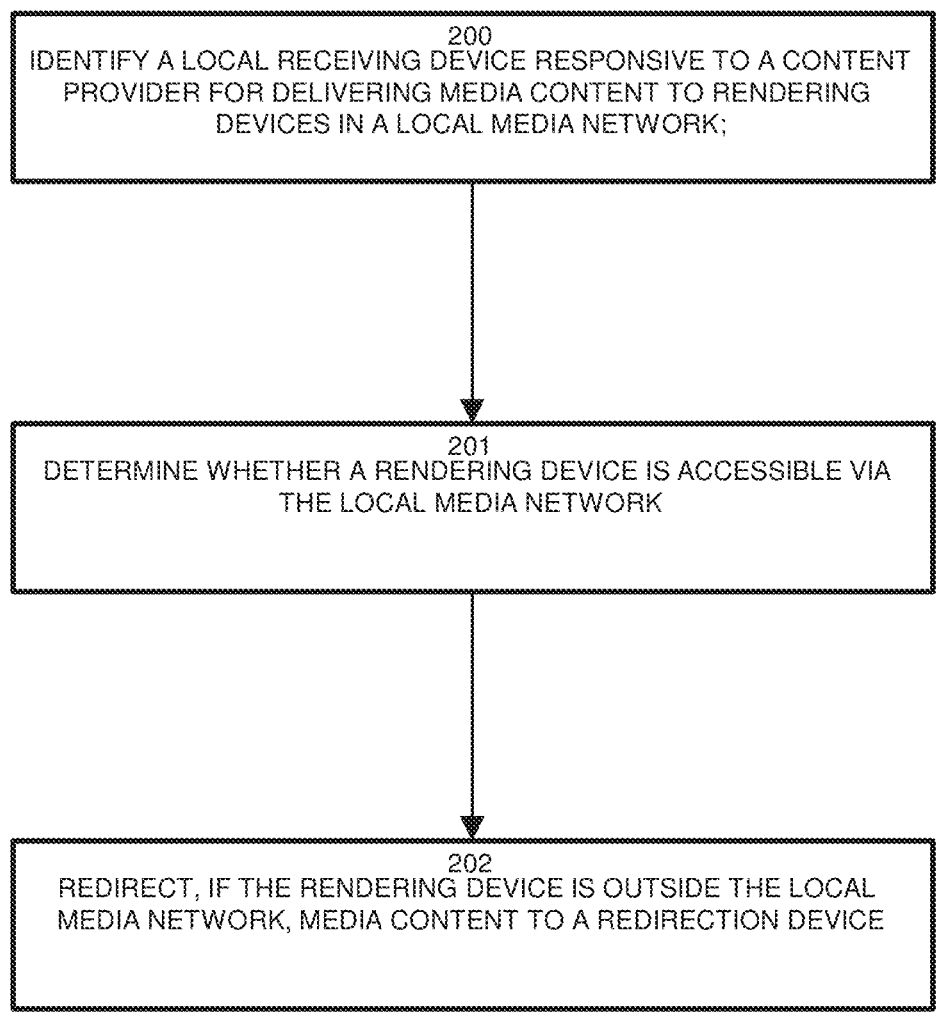
FIG. 2 is a flowchart of media delivery in the environment of FIG. 1.

FIG. 2 is a flowchart of media delivery in the environment of FIG. 1. Referring to FIGS. 1 and 2, at step 200, in a media content delivery environment 100 having subscribers coupled to a content delivery network 102 for receiving media on a rendering device 132, the method for redirecting local media content to a remote location includes identifying a local receiving device 106 responsive to a content provider for delivering media content 104 to rendering devices 132 in a local media network defined by the local rendering area 110. The redirection device 130 determines whether a rendering device 132 is accessible via the local media network serving the local rendering area 110, as depicted at step 201, and redirects, if the rendering device 132-2 is outside the local media network, the media content to a remote receiving device 140, as disclosed at step 203. If should again be emphasized that that this scenario is applicable in situations when the user has the local redirection device 130 for operating on a previously received signal, in contrast to service providers that generate a separate signal from a transmission source (not a redirection device) to a mobile rendering device.

Figure 3:
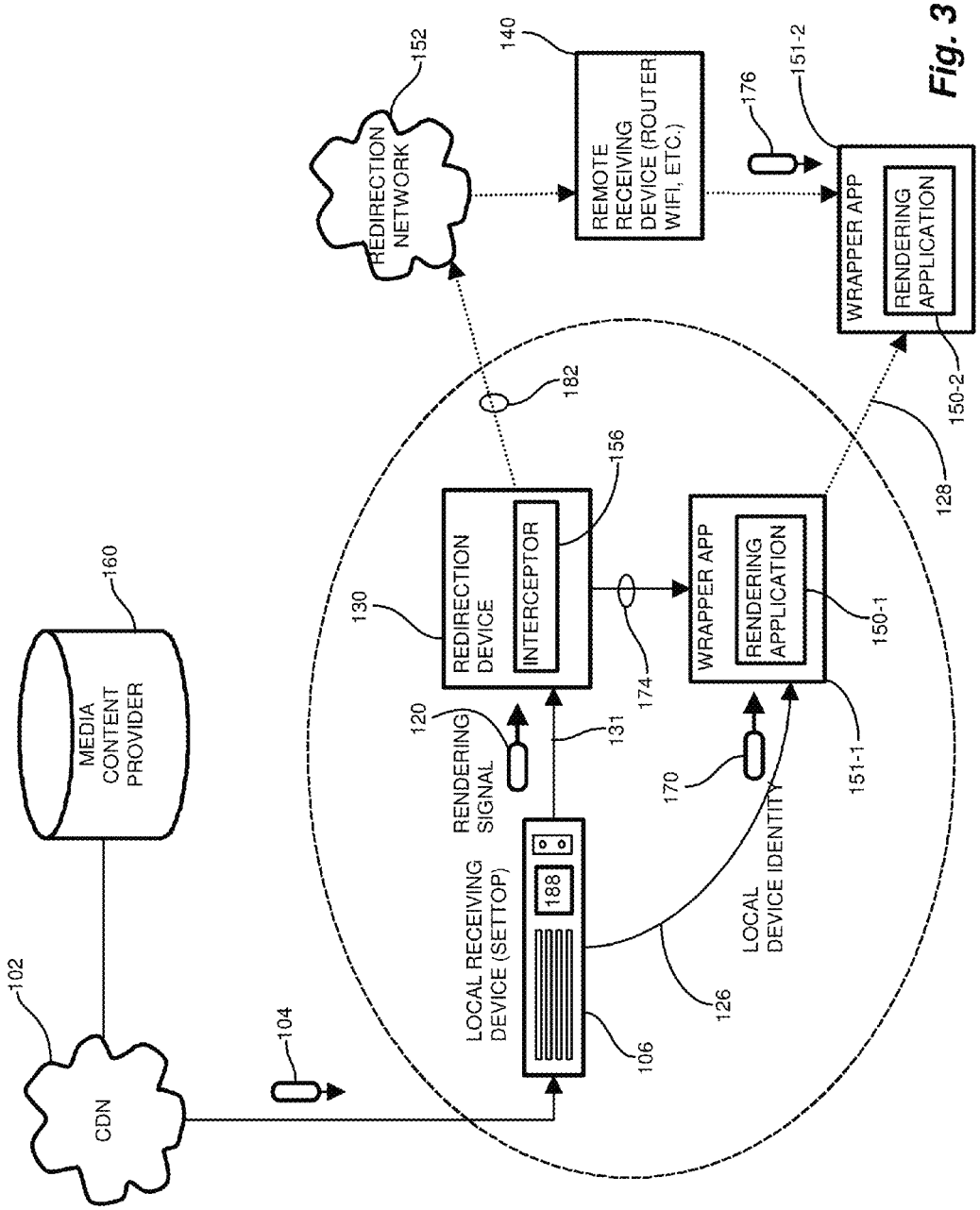
FIG. 3 is a block diagram of media redirection in the environment of FIG. 1.

FIG. 3 is a block diagram of media redirection in the environment of FIG. 1. Referring to FIGS. 1 and 3, the content delivery network 102 connects a media content provider 160 with a plurality of subscriber dwellings 112, each having one or more local receiving devices 106. From the media content 104 sent by the media content provider 160, the local receiving device 106 generates the rendering signal 120, typically a bandwidth selection of the total media content 104 signal specific to a channel or VOD selection. The redirection device 130 receives the rendering signal 120, and invokes an interceptor 156 for redirecting the rendering signal 120. Such redirection effectively results in "placeshifting" the viewing experience of the user 114, 114' because the rendering signal 120 is processed through the local receiving device 106 and then forwarded to the current location (in home or OOH) of the rendering device 132. Such placeshifting may be employed for content that the service provider otherwise would not authorize OOH consumption under the TV Everywhere use-case discussed above. Generally, such a use case arranges a specific transmission to a specific IP address associated with a corresponding rendering device. It may be fair to say that the redirected signal, having been received by the subscriber at the receiving device 150, is not bound for rendering on a particular device or mandated for rendering in a particular location, such as within the residence of the subscriber.

Redirection of the rendering signal 120 is performed by the network redirection device 130, which includes an interface 131 to the content delivery network 102 for receiving a rendering signal 120 including media content 104 for rendering on a rendering device 132, and a local output interface 172 configured for communication with a rendering device 116 in the local rendering area 110. The rendering device 132 also includes a placeshifted output interface 182 configured for communication with a rendering device 132-2 via a remote receiving device 140 outside the local rendering area 110, and an interceptor 156 responsive to a rendering preference 184 (FIG. 4, below) from the rendering device 132, in which the rendering preference 184 is for directing the rendering signal 120 to the local output interface 180 or the placeshifted output interface 182 based on the network identity 144 of a requestor (i.e. local or remote receiving device) from which the rendering preference 184 emanated.

Subsequently, the user 114 moves outside the local rendering area 110, shown by arrow 128, and consequently, the rendering application 150-2 initiates a transition for redirecting the rendering signal 120. The wrapper application 151-2 determines that the rendering device 132-2 is disposed in a different service area corresponding to a different receiving device 140. In the example shown, the remote receiving device 140 covers the area outside the local rendering area, although there are likely multiple possible transitional receiving devices, depending on the transport of the rendering device 132 (3G, 4G, or WiFi) and cellular density. The wrapper application 151 sends the network identity 144 of the remote receiving device 140 to the redirection device 130 via the network identity previously received 126. The interceptor 156 redirects the he rendering signal 120 to the remote receiving device 140 using the network identity just received, typically an IP address, via the redirection network 152. During transition, the rendering device 130 effects a seamless transition in the rendering image 133 from buffered media content, discussed further below.

Figure 4:
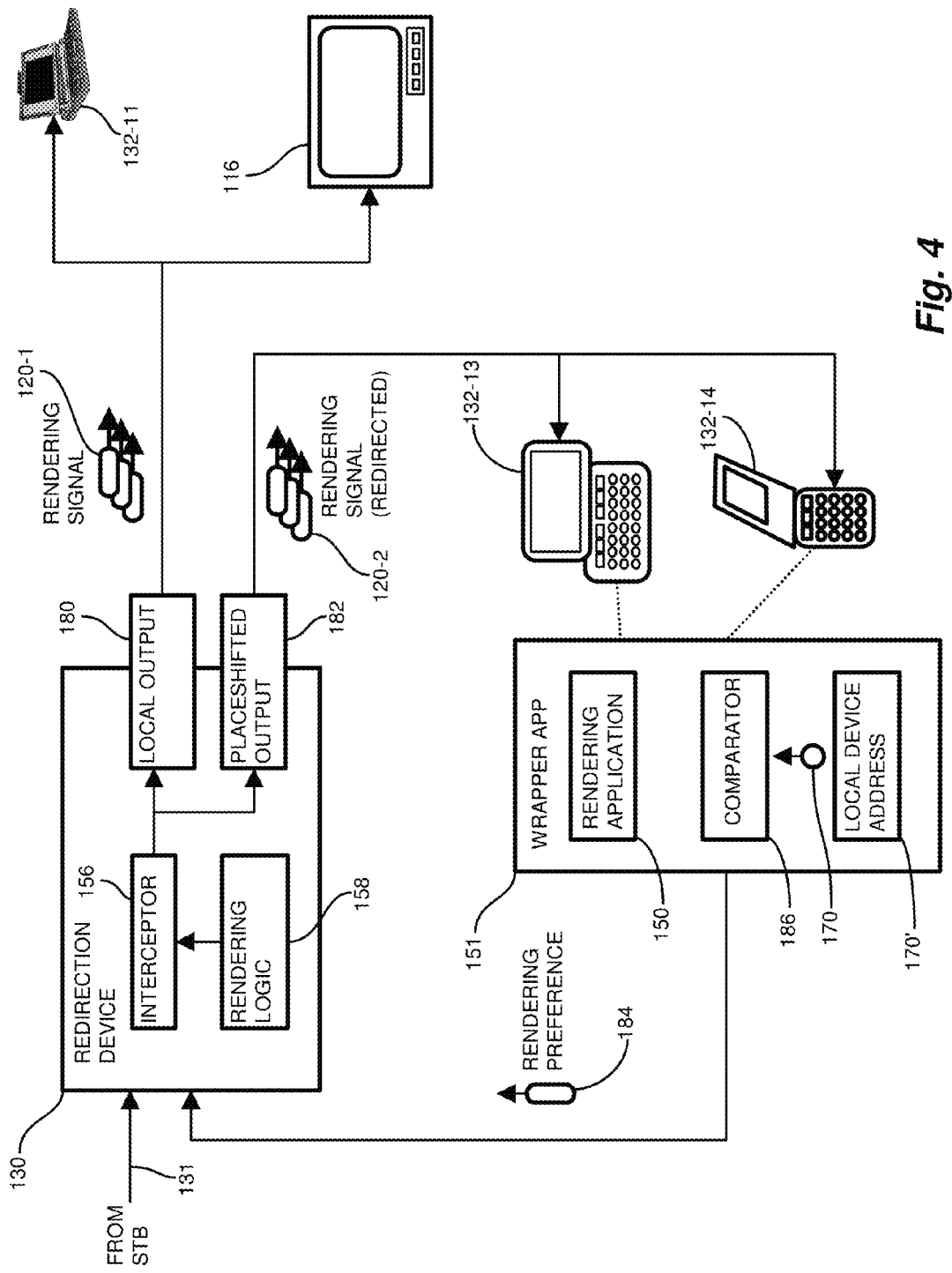
FIG. 4 is a block diagram of the redirection device employed in the redirection of FIG. 3.

FIG. 4 is a block diagram of the redirection device 130 employed in the redirection of FIG. 3. Referring to FIGS. 3 and 4, the redirection device 130 includes the interceptor 156 for intercepting the rendering signal 120-1 to the local rendering device 116, and also a local output interface 180 and a placeshifted output interface 182. The local output interface 180 transmits the rendering signal to a rendering device 132-11, 116 within the local rendering area 110, and the placeshifted output interface 182 transmits the rendering signal to an OOH rendering device 132-13, 132-14 via the redirection network 152 and the remote receiving device 140 as discussed above. Depending on the configuration, transmission to the local rendering device 116, typically a hardwired connection, may employ a separate interface 172 for a dedicated device. The local output interface 180 and placeshifted output interface 182 are generally configured to accommodate a wireless rendering device 132, such as a 3G, 4G or WiFi medium, collectively in accordance with IEEE 802.11, an industry standard for wireless communication.

The network redirection device 130 further includes an interface 182 to a transport network for placeshifting, in which the transport network interconnects a plurality of network devices for delivering media content outside the local rendering area, and rendering logic 158 for redirecting the rendering signal 120 based on a network identity of the requestor and a network identity corresponding to the local rendering area 110.

The rendering logic 158 interprets the rendering preference 184 containing the address of the corresponding local 106 or remote 140 receiving device. Alternatively, the rendering logic 158 may perform a comparison by storing a network identity of the local receiving device 106, receiving a network identity of a network device transmitting the rendering preference, comparing the network identity of the network device and the local receiving device 106, and concluding that the rendering device is located in the local receiving area based on the comparing.

In the example arrangement, the redirection device 130 is responsive to the rendering application 150 on the rendering device 132 for determining a network identity 144 of a network device 106 or 140 serving the rendering application, and determining if the identified network identity 144 corresponds to a local receiving device 106 serving the local rendering area 110.

The interceptor 156 redirects the rendering signal to a rendering device 132 upon receiving a request from the rendering application 150-1 . . . 150-2 (150 generally) launched on the rendering device 132. The rendering application 150 receives a network identity 170 corresponding to the local receiving device 106 of the local user 114, as shown by arrow 126. A wrapper application 151-1 . . . 151-2 (151 generally) running concurrently with the rendering application 150 identifies the receiving device via message 176, indicating the network identity (such as an IP address) of either the local 106 or remote 140 receiving device from which the rendering device 150 receives media signals. If the receiving device is the local receiving device 106, the wrapper application 151 determines that the rendering device 132 is still within the local rendering area 110, and transmits the rendering signal via local wired 172 or wireless 174 connections.

The redirection device 130 is responsive to the media rendering device 132 for remotely receiving media content, in which the rendering device 132 includes the rendering application 150 for receiving a rendering signal 120, such that the rendering signal 120 is configured to render received media content 104 on a user perceivable medium (i.e. display screen). The rendering application 150 operates in conjunction with the wrapper application 151 for determining if the rendering signal 120 is to be sent to either a local rendering area 110 or a remote receiving device 140 outside the local rendering area. The rendering device 132 includes (or has access to) a comparator 186 for receiving a network identity of a requestor of the rendering signal, and for comparing the received network identity to a network identity corresponding to the local rendering area 110. Also included is an interface 174, 182 to the redirection device 130, in which the redirection device 130 is responsive to the rendering preference 184 from the wrapper application 151. The rendering preference 184 is indicative of a receiving device 106, 140 to which the rendering signal 120 is to be sent depending on the local or remote (based on identity 144) location of the rendering device 132. The rendering preference 184 therefore selects a local output 180 or a placeshifted output 182 of the redirection device 132, in which the local output 180 is for sending the rendering signal 120 to the local rendering area 110, and the placeshifted output 182 is for sending the rendering signal 120 to the remote receiving device 140, such that the rendering preference 184 is further indicative of the network identity (i.e. IP address) of the remote receiving device 140, in the event of a remote selection.

Responsive to a remote rendering preference 184, the rendering application 150 receives a redirected rendering signal 120-2 including the media content 104 from the local receiving device 106 to the rendering device 132 via the redirection network 152, in which the redirection device 130 is coupled between the rendering device 132 and the redirection network 152 for transporting the redirected rendering signal, typically via a wireless medium such as 3G, 4G or WiFi. In the case of a local transmission, the media content is delivered the local receiving device 116, 132-1 pursuant to a contractual arrangement, and redirecting of the rendering signal occurs after the media content has been received by the local receiving device 106

The wrapper application 151 identifies the current receiving device (local 116 or remote 140), and invokes a comparator 184 for comparing the current receiving device identity with the stored local device address 170.' Based on the comparison, the wrapper application sends a rendering preference 184 to the redirection device including the address of the remote receiving device 140, if the preference is for redirection. Rendering logic at the redirection device selectively invokes either the local output 180 or the place-shifted output 182 to the address 176 of the remote receiving device 140 for rendering on the rendering device 132.

Figure 5:
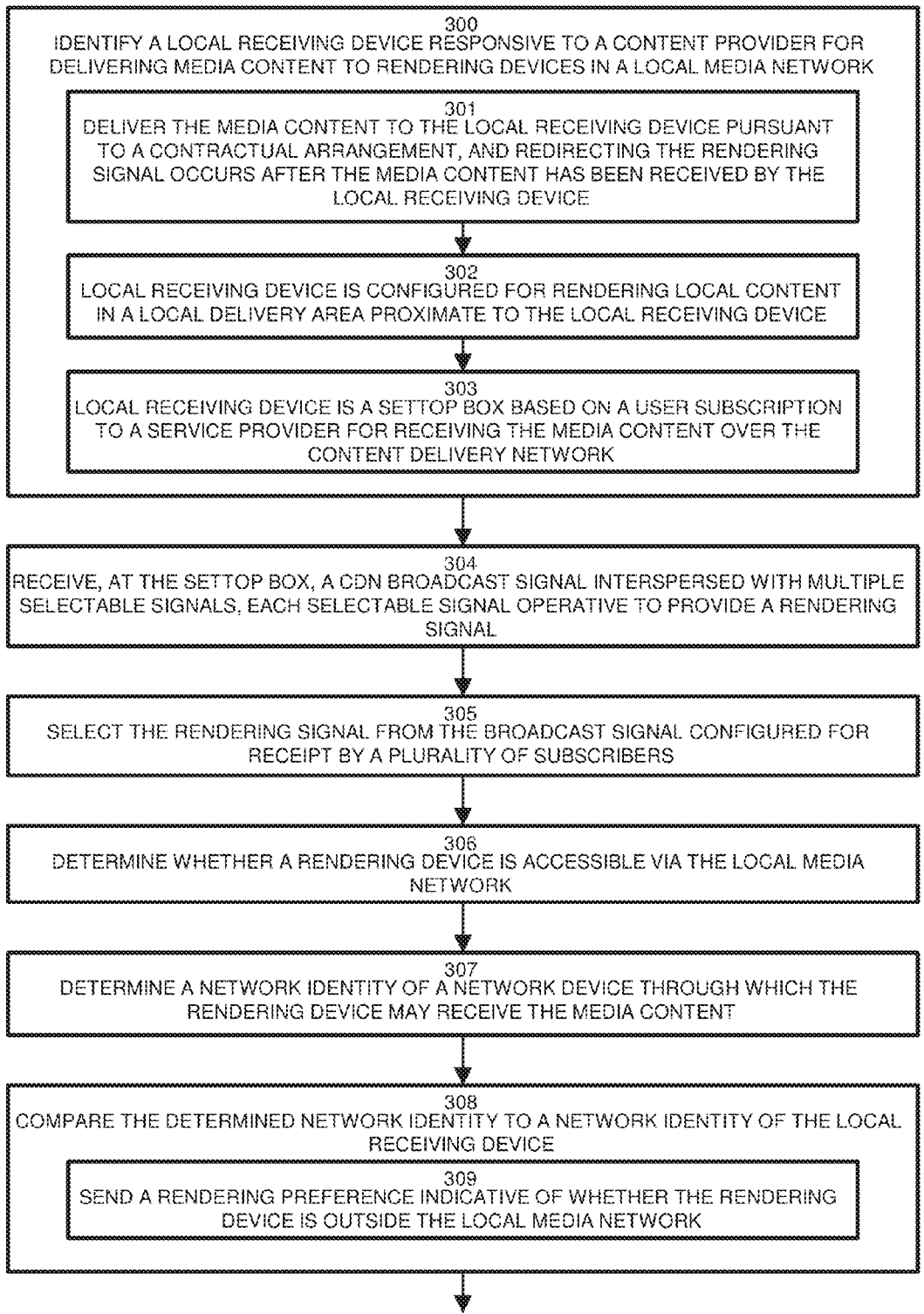
FIGS. 5-6 are a flowchart of media content redirection as in FIG. 3.
Figure 6:
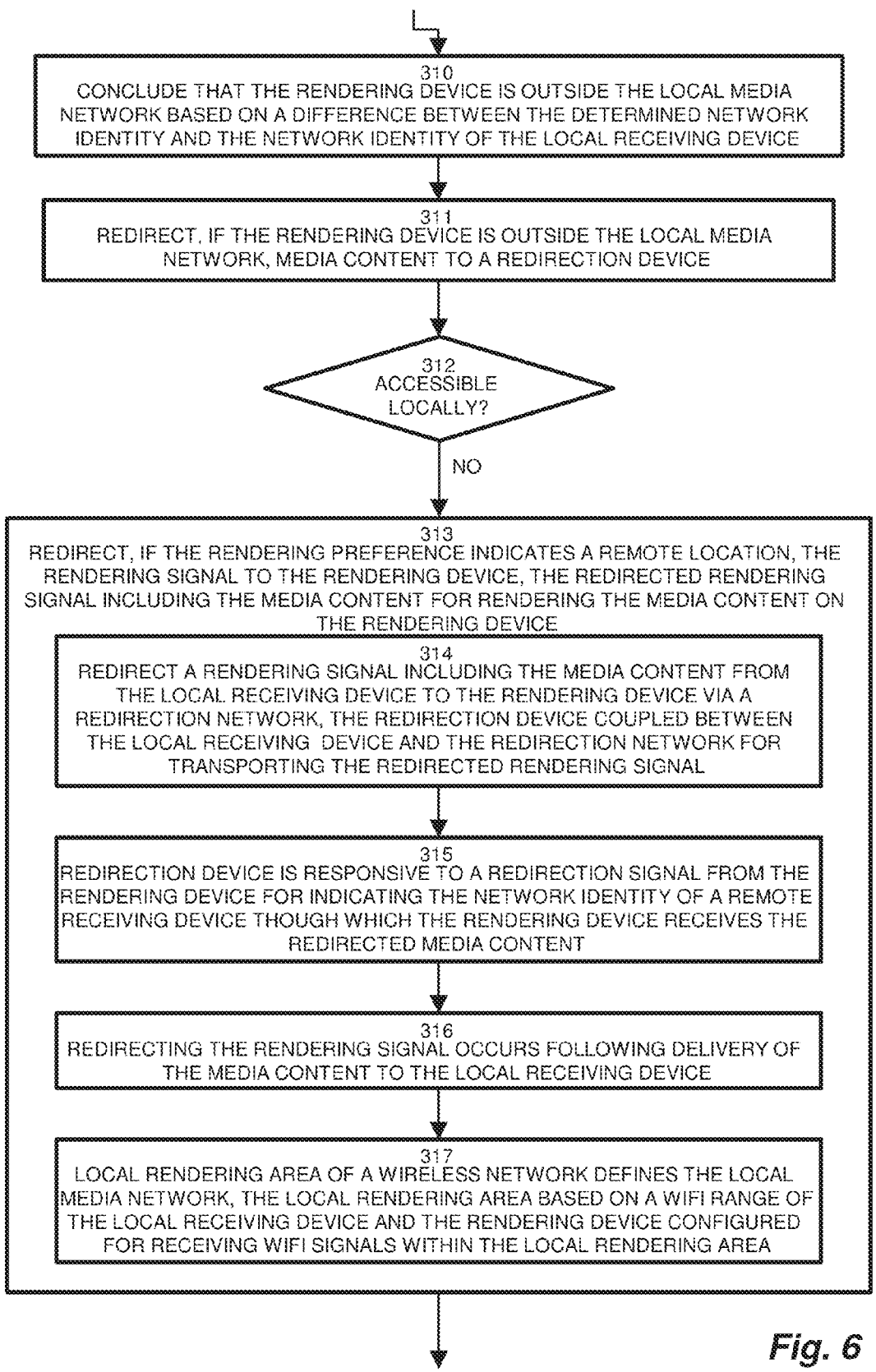

FIGS. 5-6 are a flowchart of media content redirection as in FIG. 3. Referring to FIGS. 3 and 5-6, at step 300, the rendering device 132 identifies a local receiving device 106 responsive to a content provider 160 for delivering media content 104 to rendering devices 132 in a local media network 110. The content provider 160 delivers the media content 104 to the local receiving device pursuant 106 to a contractual arrangement, as disclosed at step 301. The local receiving device 106 is configured for rendering local content in a local delivery area 110 proximate to the local receiving device 110, as depicted at step 302. In the example arrangement, the local receiving device 106 may be a settop box or addressable device based on a user subscription to the service provider 160 for receiving the media content 104 over the content delivery network 102, as shown at step 303. Typically, the local delivery area 110 corresponds to direct wired connections 172 and WiFi transmissions 174 in and around the curtilage of a dwelling 112 in which the local receiving device is disposed.

The local rendering environment 110 receives, at the local receiving device, a CDN broadcast signal 104 interspersed with multiple selectable signals, each selectable signal operative to provide a rendering signal, as depicted at step 304, and the user 114 selects the rendering signal from the broadcast signal 104 configured for receipt by a plurality of subscribers, as depicted at step 305. Redirection of the rendering signal 120 occurs after the media content 104 has been received by the local receiving device 106, therefore the rendering signal 120 includes only the requested video content or stream has been filtered from the generally available bandwidth by a channel selection, VOD request, or other bandwidth/channel selection. Selection of the rendering signal 120 may be performed by the rendering application 150 or a remote 124 directly controlling the local receiving device 106.

The rendering application 150 determines whether the requesting rendering device 132 is accessible via the local media network 110, as shown at step 306, and determines a network identity of a network device (106 or 140) through which the rendering device 132 may receive the rendering signal 120 from the media content 104, as depicted at step 307. The in contrast to conventional approaches, the redirection device 130 and rendering application 150 are operating on a previously received signal, in contrast to service providers that generate a separate signal from a transmission source (not a redirection device) to a mobile rendering device. The network identity of the local receiving device 106 and the remote receiving device 140 may be an IP address or other suitable identifier, such as a MAC address or similar designation. The wrapper application 151 compares the determined network identity to a network identity of the local receiving device 106 to determine if the rendering device 132 is disposed in the local rendering area, as shown at step 308. The rendering application 150 also sends a rendering preference 184 indicative of whether the rendering device 132 is outside the local media network 110, as shown at step 309.

The rendering application 150 concludes that the rendering device is outside the local media network based on a difference between the determined network identity 176 and the network identity 170 of the local receiving device 106, as shown at step 310, and redirects, if the rendering device 132 is outside the local media network 110, the media content to a redirection device 140, as depicted at step 311.

A check is performed, at step 312, to determine if the rendering device 132-2 is available in the local rendering area 110. If the rendering device 132-2 is remotely disposed, then the redirection device 130, responsive to the rendering application 150, redirects, if the rendering preference 184 indicates a remote location, the rendering signal 120 to the rendering device 132, such that the redirected rendering signal 120-2 includes the requested media content for rendering the media content on the rendering device 130-2, as disclosed at step 313.

This includes redirecting a rendering signal 120 including the media content from the local receiving device 106 to the rendering device 132 via a redirection network 152, in which the redirection device 130 is coupled between the local receiving device 106 and the redirection network 152 for transporting the redirected rendering signal 120-2, as depicted at step 314. The redirection device 130 is responsive to a redirection signal, or rendering preference 184, from the rendering device 132 for indicating the network identity of a remote receiving device 140 though which the rendering device 132 receives the redirected media content in the rendering signal 120, as shown at step 315.

In the example configuration, redirecting the rendering signal 120 occurs following delivery of the media content 104 to the local receiving device 106, as depicted at step 316, such that the redirected rendering signal 120-2 is merely forwarded from the local receiving device 106 over an independent connection, as depicted at step 316. In the example shown, a local rendering area 110 of a wireless network defines the local media network, in which the local rendering area is based on a WiFi range of the local receiving device 106 and the rendering device 132 configured for receiving WiFi signals within the local rendering area, as disclosed at step 317.

Figure 7:
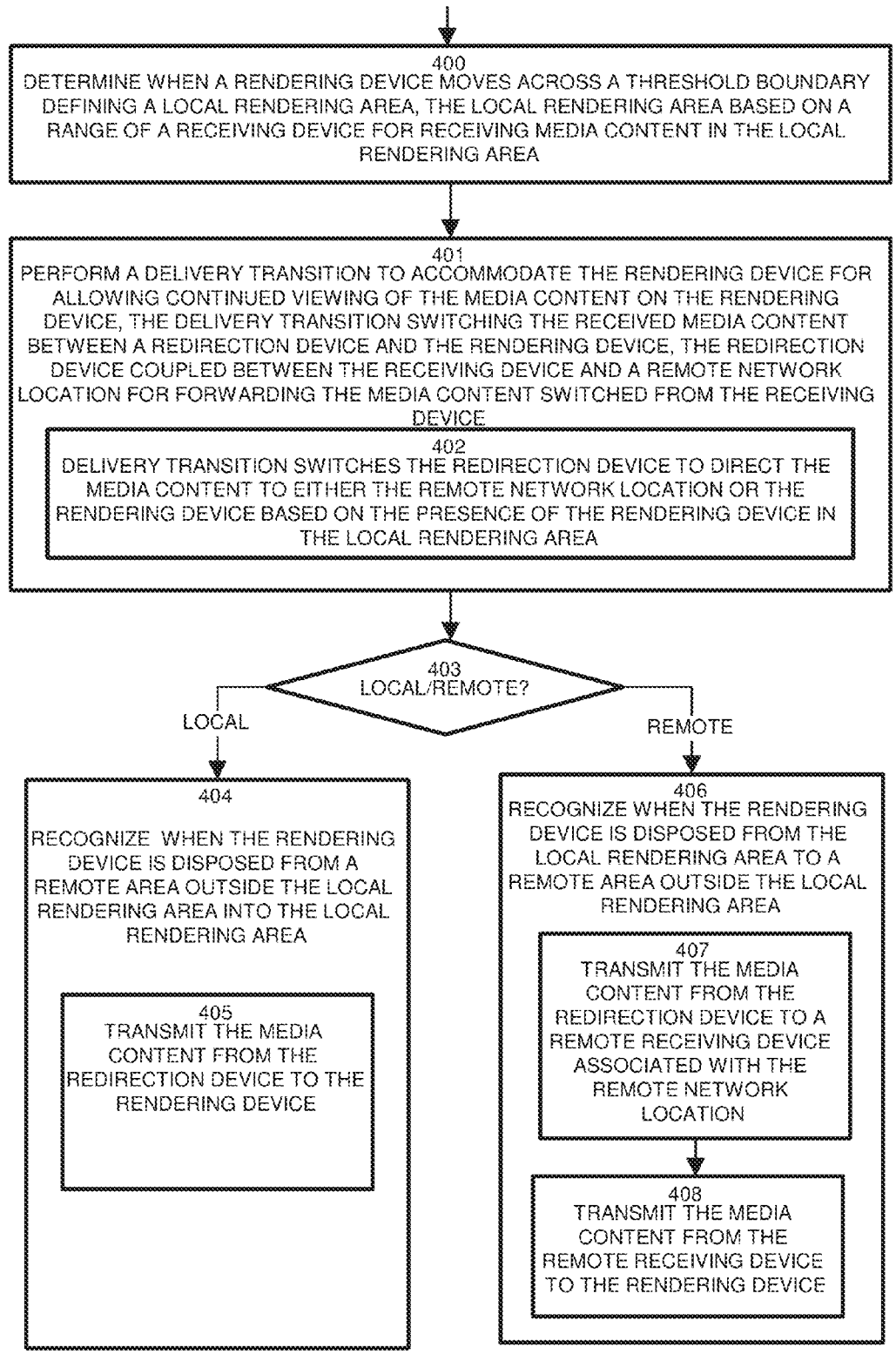
FIG. 7 is a flowchart of rendering device transition between an OOH (out of home) and a local rendering area as in FIG. 4.

FIG. 7 is a flowchart of rendering device transition between an OOH (out of home) and a local rendering area. A rendering device 132 running the redirection application 150 performs a real-time switchover, or redirection, such that a rendered image resulting from the current rendering stream (rendering signal) transitions seamlessly due to buffering of the rendering stream at the redirection device 130 until additional renderable material can be obtained from the corresponding receiving device 106, 140. The rendering application 150 determines when the rendering device 132 moves across a threshold boundary defining a local rendering area 110, in which the local rendering area 110 is based on a range of a receiving device 106 for receiving media content 104 in the local rendering area 110, as depicted at step 400. The rendering application 150 performs a delivery transition to accommodate the rendering device 132 for allowing continued viewing of the media content 104 on the rendering device, such that the delivery transition switches the received media content between a redirection device 106, 140 and the rendering device 132, as disclosed at step 401. As the redirection device 130 is coupled between the receiving device 106 and a remote network location such as receiving device 140 for forwarding the media content switched from the receiving device 106, the remote network location 140 is configured to forward the switched media content 104 to the rendering device 132.

The delivery transition therefore switches the redirection device 106, 140 to direct the media content 104 to either the remote network location 140 or the rendering device 132 based on the presence of the rendering device 132 in the local rendering area 110, as shown at step 402. A check is performed, at step 403, to determine if the transition is to the local rendering area or the remote (OOH) service area.

In the case of a local transition, switching the media content 104 includes recognizing when the rendering device 132 is disposed from a remote area outside the local rendering area into the local rendering area 110, as shown at step 404, and transmitting the media content 104 from the redirection device 130 to the rendering device 132-1, as depicted at step 405.

In the case of a remote switchover, switching the media content 104 includes recognizing when the rendering device 132 is disposed from the local rendering area 110 to a remote area outside the local rendering area, as depicted at step 406. Rendering the media content 104 (rendering signal 120) includes transmitting the media content 104 from the redirection device 130 to a remote receiving device 140 associated with the remote network location, such as a router, cellular base, or WiFi hotspot, as depicted at step 407, and transmitting the media content 104 from the remote receiving device 140 to the rendering device 132-2, as shown at step 408.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of rendering media content received at a local receiving device serving a local media network, comprising:
receiving a rendering signal from the local receiving device, the rendering signal having media content, at a redirection device coupled to the local media network, the local media network operative to transport media content from a content provider to rendering devices in the local media network;
determining that an intended rendering device is not connected to the local media network;
determining a specific network identifier indicative of the intended rendering device on a redirection network, the redirection device coupled between the local receiving device and the redirection network; and
redirecting the rendering signal being received from a content provider from the redirection device to a current location of the intended rendering device by transmitting the rendering signal according to a specific network identifier corresponding to the intended rendering device, the rendering signal received by the local receiving device including the specific network identifier for the intended rendering device.

2. The method of claim 1 wherein the rendering signal includes a network identifier indicative of the intended rendering device; and
the local receiving device examines the network identifier before forwarding the rendering signal to the redirection device.

3. The method of claim 1 further comprising:
identifying a network identifier of the intended rendering device;
comparing the identified network identifier to network identifiers of rendering devices available on the local media network; and
concluding that the network identifier of the intended rendering device is not included in the network identifiers available on the local media network.

4. The method of claim 1 wherein the local media network corresponds to a subscriber of the content provider, and the rendering signal is received by the local receiving device before rendering on a rendering device connected to the local media network or redirected via the redirection device.

5. The method of claim 4 further comprising delivering the media content to the local receiving device pursuant to a contractual arrangement, and redirecting the rendering signal occurs after the media content has been received by the local receiving device.

6. The method of claim 1 wherein the local receiving device is a settop box based on a user subscription to the service provider for receiving the media content over the content delivery network, the local delivery area corresponding to direct wired connections and WiFi transmissions in and around the curtilage of a dwelling in which the local receiving device is disposed.

7. The method of claim 1 further comprising
receiving a rendering signal inclusive of the media content at the local receiving device;
receiving a rendering preference indicative of whether the rendering device is outside the local media network; and
redirecting, if the rendering preference indicates a remote location, the rendering signal to the rendering device, the redirected rendering signal including the media content for rendering the media content on the rendering device.

8. The method of claim 1 wherein the redirected rendering signal passes through the redirection device using the same source before and after the redirection to the intended rendering device.

9. The method of claim 1 wherein the redirection includes receiving the rendering signal at the local receiving device and, following receipt by the local receiving device, forwarding the rendering signal from the local receiving device to the intended rendering device, the local receiving device continuing as a source of the rendering signal received by the intended rendering device.

10. The method of claim 1 wherein the rendering signal passes through the local receiving device during transport to the intended receiving device for avoiding an additional stream from the content provider.

11. A media redirection device, comprising:
    an interface to a local receiving device on a local media network for receiving a rendering signal, the rendering signal having media content, the local media network operative to transport media content from a content provider to rendering devices in the local media network;
    rendering logic for determining that an intended rendering device of the media content is not connected to the local media network, the rendering logic configured for determining a specific network identifier indicative of the intended rendering device on a redirection network, the redirection device coupled between the local receiving device and the redirection network; and
    a placeshifted output interface to a redirection network for redirecting the rendering signal being received from a content provider from the redirection device to a current location of the intended rendering device by transmitting the rendering signal according to a specific network identifier corresponding to the intended rendering device the rendering signal received by the local receiving device including the specific network identifier for the intended rendering device.

12. The device of claim 11 wherein the rendering signal received by the local receiving device is intended for the intended rendering device.

13. The device of claim 11 wherein the local receiving device is configured to examine the network identifier before forwarding the rendering signal to the redirection device.

14. The device of claim 11 wherein the rendering logic is further configured to:
    identify a network identifier of the intended rendering device;
    compare the identified network identifier to network identifiers of rendering devices available on the local media network; and
    conclude that the network identifier of the intended rendering device is not included in the network identifiers available on the local media network.

15. The device of claim 11 wherein the local media network corresponds to a subscriber of the content provider, and the rendering signal is received by the local receiving device before rendering on a rendering device connected to the local media network or redirected via the redirection device.

16. The device of claim 15 wherein the content provider delivers the media content to the local receiving device pursuant to a contractual arrangement, and redirecting the rendering signal occurs after the media content has been received by the local receiving device.

17. The device of claim 11 wherein the local receiving device is a settop box based on a user subscription to the service provider for receiving the media content over the content delivery network, the local delivery area corresponding to direct wired connections and WiFi transmissions in and around the curtilage of a dwelling in which the local receiving device is disposed.

18. The device of claim 11 wherein:
    the interface is configured to receive a rendering signal inclusive of the media content from the local receiving device;
    the rendering logic is operable to receive a rendering preference indicative of whether the rendering device is outside the local media network; and
    the placeshifted output interface is configured to redirect, if the rendering preference indicates a remote location, the rendering signal to the rendering device, the redirected rendering signal including the media content for rendering the media content on the rendering device.

19. A system for rendering media content, comprising:
    a local receiving device for receiving a rendering signal having media content from a content provider, the local receiving device coupled to a local media network operative to transport media content from the content provider to rendering devices in the local media network;
    a redirection device for receiving the rendering signal forwarding from the local receiving device, the redirection device coupled to the local media network;
    rendering logic for determining that an intended rendering device is not connected to the local media network, the rendering logic further operable to determine a specific network identifier indicative of the intended rendering device on a redirection network, the redirection device coupled between the local receiving device and the redirection network; and
    an interface to the redirection network for redirecting the rendering signal being received from a content provider from the redirection device to a current location of the intended rendering device by transmitting the rendering signal according to a specific network identifier corresponding to the intended rendering device, the rendering signal received by the local receiving device including the specific network identifier for the intended rendering device.

20. The system of claim 19 wherein the rendering signal received by the local receiving device is intended for the intended rendering device.

* * * * *